2 Sheets—Sheet 1.

G. G. HUNT.

Base Burning Stove.

No. 3,965. Reissued May 10, 1870.

WITNESSES
J. W. Coombs
G. W. Reed

INVENTOR
G. G. Hunt
per Munn & Co

N. PETERS, Photo-Lithographer, Washington, D. C.

G. G. HUNT.

2 Sheets—Sheet 2.

Base Burning Stove.

No. 3,965.

Reissued May 10, 1870.

WITNESSES
J. W. Coombs.
G. W. Reed

INVENTOR
G. G. Hunt.
per Munn & Co.

N. PETERS, Photo-Lithographer, Washington, D. C.

UNITED STATES PATENT OFFICE.

GEORGE G. HUNT, OF QUINCY, ILLINOIS.

BASE-BURNING STOVE.

Specification forming part of Letters Patent No. 38,828, dated June 9, 1863; Reissue No. 3,965, dated May 10, 1870.

*To all whom it may concern:*

Be it known that I, G. G. HUNT, of Quincy, in the county of Adams and State of Illinois, have invented a new and useful Stove for Burning Bituminous and other Coals; and I do hereby declare that the following is a full, clear, and exact description of the same, reference being had to the accompanying drawings, forming part of this specification, in which—

Figure 1:
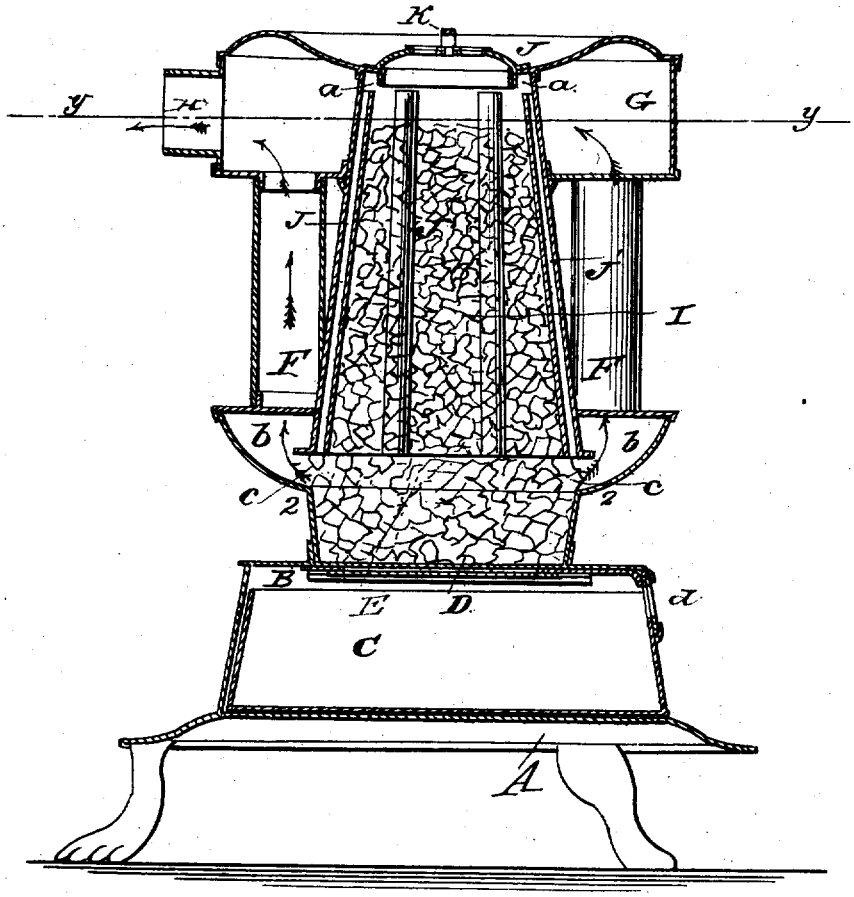
Figure 2:
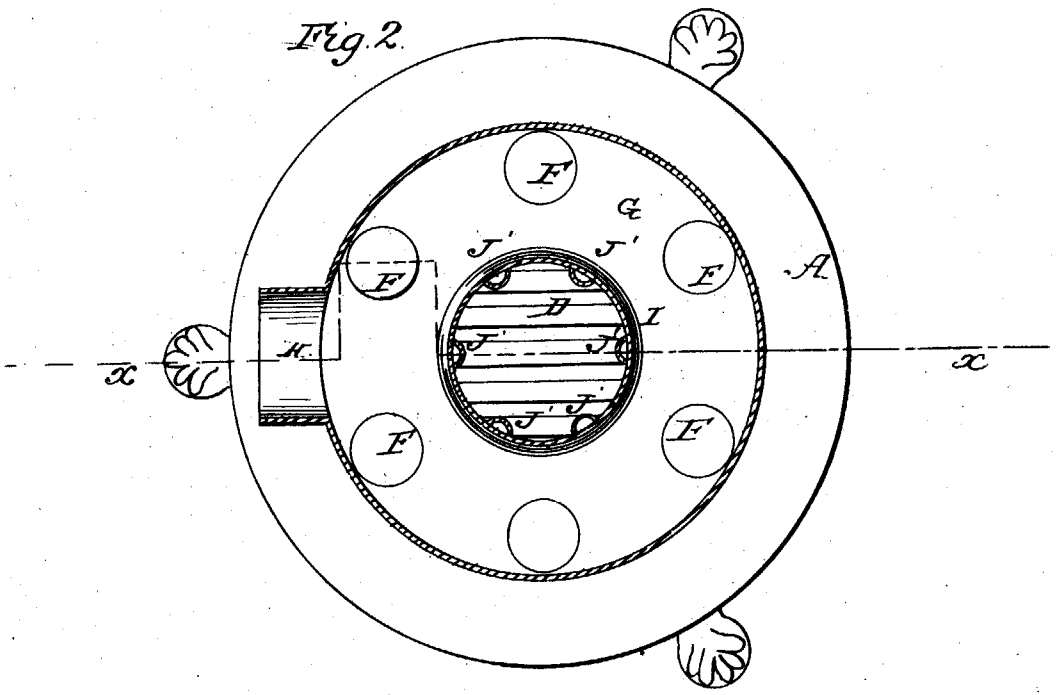

Figure 1 is a vertical section of my invention, taken on the line *x x*, Fig. 2. Fig. 2 is a horizontal section of the same, taken on the line *y y*, Fig. 1.

Similar letters of reference indicate like parts in the two figures.

The object of this invention is to obtain a stove which will burn all the gases evolved by imperfect combustion, thereby preventing the formation of soot when burning bituminous coal, and which (the soot) has been a source of great annoyance in stoves of the ordinary construction, as the pipes or flues fill up rapidly, and therefore have to be often taken down and cleaned.

In thus consuming the gases there is also a great saving made in fuel, being in many kinds of coal as much as fifty per cent. This in stoves of ordinary kinds goes off in the form of gas, taking, when using bituminous coal, solid particles of carbon with it.

To enable those skilled in the arts to fully understand and construct my invention, I will proceed to describe it.

A, Fig. 1, represents the base of the stove, on which the ash-box B is placed. The latter may be provided with a drawer, C, and also having a damper, *d*, for admitting air to the fire, as hereinafter described.

E represents the fire-pot, which is fitted on the ash-box B.

At the lower extremity of E is placed the grate D, which may be fastened in place, in the usual simple manner, by a frame on which it rests, or by pivots on opposite sides, upon which it may turn.

F represents a series of tubes or flues, the lower ends of which communicate with the combustion-chamber *b*, as shown in Fig. 1.

The upper ends of the tubes F communicate with an annular chamber, G, with which the smoke-pipe H communicates.

I represents a conical chamber, the lower end being of a larger diameter than the upper end, and having its lower end centrally fitted into the upper wall of the chamber *b*, and projecting down into and below the said upper wall of the chamber *b*, thus forming a barrier which prevents the coal from filling the chamber *b*, which is a chamber for the combustion of the gases evolved from the coal. This projection also serves as a barrier to the admission of said gases to chamber *b* from that portion of the coal lying in chamber I, except in the case of said gases passing downward through and among the coal in chamber I, and passing below the walls of said chamber and into chamber *b*, as indicated by the arrows in Fig. 1, and thus coming in contact with the incandescent coal, which thus heats said gases to the degree necessary for combustion, or, in case the coal in said chamber I becomes so packed as it swells in heating, said gases may escape by the tubes or passages J′, as shown by the arrows in the upper part of chamber I. In case the damper K is open, air will enter and follow the course of and mingle with the gases evolved in chamber I, thus supplying oxygen for combustion of said gases when heated to the proper degree, which takes place before or on entering chamber *b*.

The chamber I is provided with a cover or door, J, for supplying said chamber with coal, and has a damper, K, which serves to admit a supply of air for the purposes described immediately preceding this paragraph.

The chamber I is provided with a passage or passages, J′, extending from and communicating with the upper part of the interior of said chamber I, and extending downward, and at the lower end communicating with the combustion-chamber *b*, for the purposes already described, viz., for an escape-passage for gases which might otherwise be confined in the upper part of chamber I, and which would thus accumulate, so as to escape into the room, thus being deleterious to health and comfort.

The top or upper part of chamber I is provided with a projection or flange, *a*, Fig. 1, which projects downward into said chamber far enough to prevent coal from getting into the passage J′.

It will be observed, on examining the construction of the stove, as shown in Fig. 1, that the lower ends of the walls of chamber I extend down through the upper wall of and into chamber *b*, and are in such a relative position with the inner angle 2 of the fire-pot, or the wall thereof, as to form a narrow annular space or throat, C, through which all the gases evolved have to pass, both from chamber I and from E. At this particular point air is also admitted by the tubes or passage J′, so that practically no gas can enter chamber *b* without first coming in contact with a supply of oxygen sufficient for combustion.

It will also be observed, by referring to Fig. 1, that the chamber or fuel-reservoir I is, as has been described, conical, which is true, but, in reality, the shape is better described as being of the form of the frustum of a cone with the larger end downward.

The operation of the above-described stove or furnace is as follows: A fire is kindled in the fire-pot E with a quantity of coal sufficient, say, to come up to or fill said chamber E to the bottom of chamber I, and damper *d*, in the base of the stove, is opened, when the fire burns upward in the ordinary way, the smoke and gases entering chamber *b* and escaping by flues F. When the fire is fairly ignited or going well, the chamber I is nearly filled with coal, when the heat from the burning coal in the fire-pot E causes the gases immediately to evolve from said coal in chamber I, and, the damper K in the upper part of said chamber I being now opened, a current of air enters, and, uniting and mingling with said gases, they descend into and among the coal in said chamber I, and, coming in contact with the now incandescent coal at the lower end of chamber I, pass laterally outward beneath the lower end of said chamber I, meeting at this point a current of gases from the fire or coal in the fire-pot E, and together passing into the combustion-chamber *b*, where they are consumed, and the products of combustion pass off and escape by the flues F into the chamber G and smoke-pipe H.

In cases where coal of a finely-divided state is used, the said coal, upon being heated, swells in chamber I, and sometimes by that means bocomes so tightly packed as to partially prevent the free escape of and descent of the gases and air in the upper part of chamber I; and to avoid the trouble caused by such an event taking place, an escape passage or passages are made, as shown at J′, Fig. 1, the operation of which is as follows: Whenever the coal becomes packed, as described, the gases may pass through openings at or near the upper extremity of the chamber I, and into the passages J′, when they descend and escape into the space *c* or combustion-chamber *b*, and are thus consumed or pass off by the flues F.

I am aware that a device for admitting air at the upper part of, and from the outside of, a fuel-supplying chamber, and descending through a passage surrounding said chamber, and escaping at the lower end thereof, for the purpose of a downward draft and other purposes, as described in Letters Patent No. 28,482, to J. C. Henderson, has been used; therefore I do not claim such a device as mine. Nor do I claim placing a fuel-supplying chamber in a stove whereof the lower end projects down to the surface of the incandescent fuel, as such a device is common to base-burning stoves, and it is only in the particular form described that I pretend to make any claim whatever to such a device.

Having thus described the construction and operation of my invention, what I claim as new, and desire to secure by Letters Patent, is—

1. The combination of the fire-pot E, the fuel-supplying chamber I, the air-damper K, and combustion-chamber *b*, when used in the manner and for the purposes hereinbefore specified.

2. The combination of the fire-pot E, fuel-chamber I, and dampers K and *d*, when used in the manner and for the purposes hereinbefore specified.

3. The combination of the escape-passages J′, or their equivalent, with a fuel-supplying chamber, I, when used for the purposes hereinbefore specified.

4. The combination of the escape-passages J′, or their equivalent, with a fuel-supplying chamber, I, and damper K, when used in the manner and for the purposes specified.

5. The combination of the escape-passages J′, or their equivalent, the chamber I, damper K, and pendent flange *a*, when used in the manner and for the purposes specified.

6. The combination of the chamber I, fire-pot E, combustion-chamber *b*, tubes F, annular chamber G, and dampers K and *d*, when arranged and used in the manner and for the purposes specified.

7. The annular throat C, when used in combination with and formed by the fire-pot E and fuel-chamber I, in the manner and for the purposes hereinbefore specified.

GEO. G. HUNT.

Witnesses:
R. CROSS,
C. F. HUNT.